Oct. 13, 1964  S. S. TRESILIAN ETAL  3,152,776
VEHICLES OF USE ON LAND AND IN THE AIR
Filed March 28, 1961  12 Sheets-Sheet 1
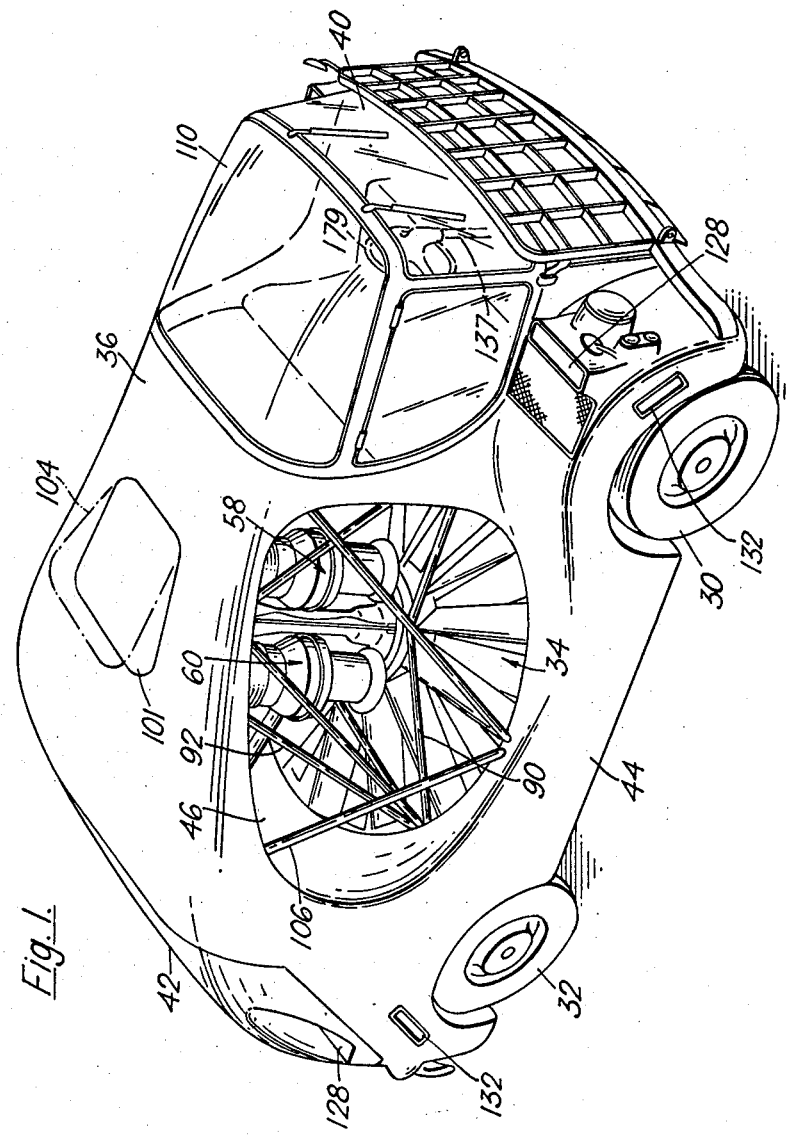
Inventors:
STEWART STEWART TRESILIAN and
ARTHUR JOHN ALEXANDER MITCHELL
By
Bailey, Stephens & Huettig
Attorneys Oct. 13, 1964    S. S. TRESILIAN ETAL    3,152,776
VEHICLES OF USE ON LAND AND IN THE AIR
Filed March 28, 1961    12 Sheets-Sheet 2
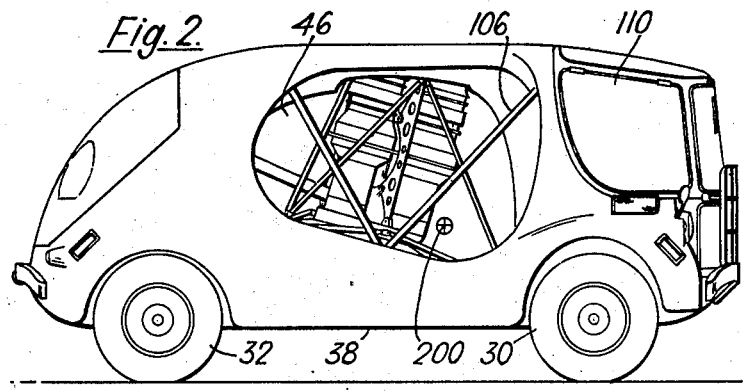
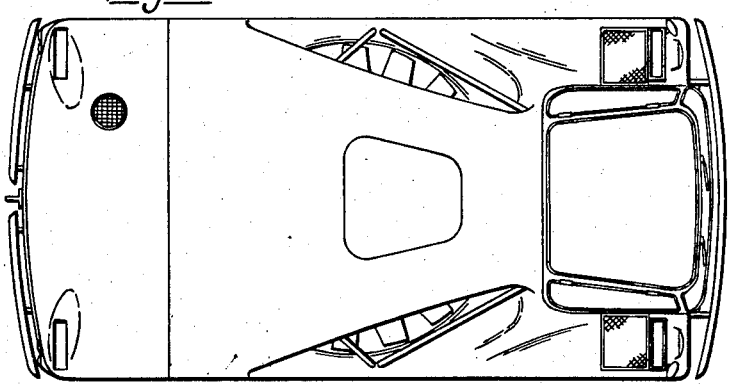
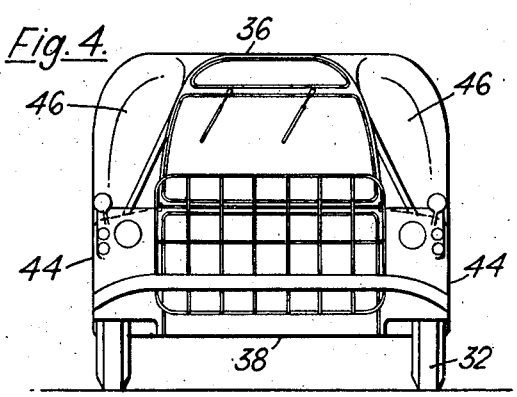
Inventors:
STEWART STEWART TRESILIAN and
ARTHUR JOHN ALEXANDER MITCHELL
By
Bailey, Stephens & Huettig
Attorneys

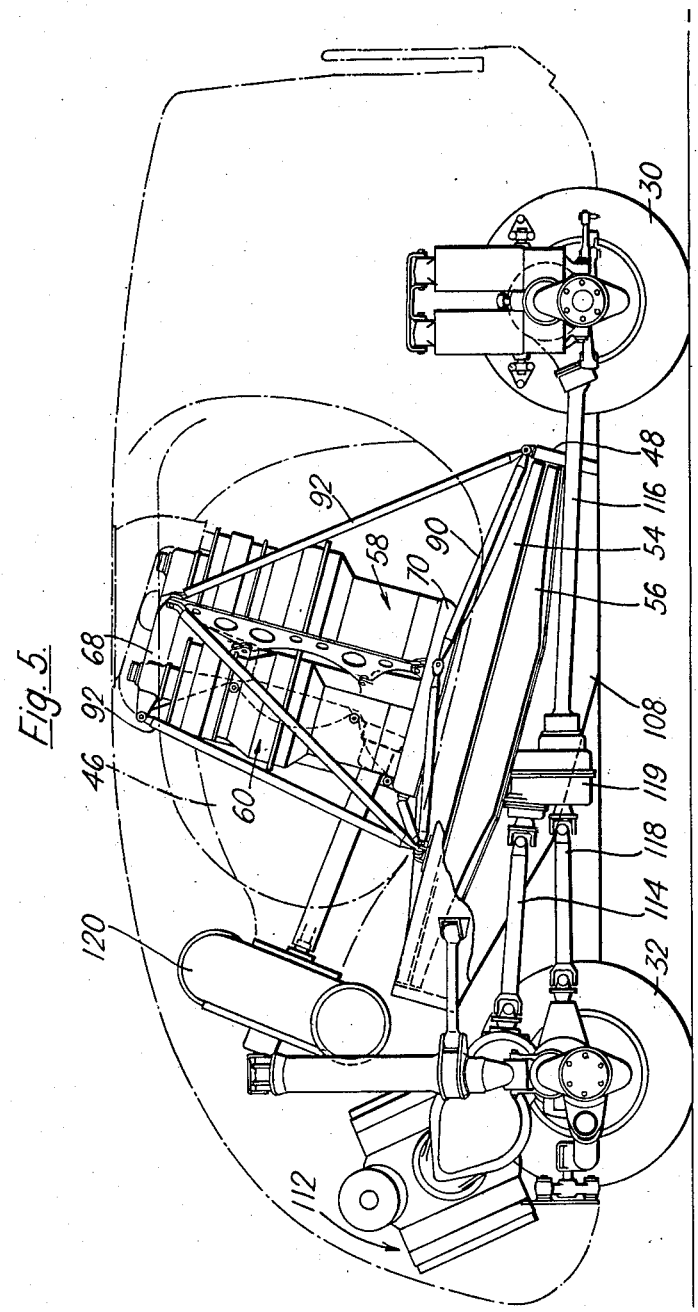

Oct. 13, 1964  S. S. TRESILIAN ETAL  3,152,776
VEHICLES OF USE ON LAND AND IN THE AIR
Filed March 28, 1961  12 Sheets-Sheet 4

Inventors
STEWART STEWART TRESILIAN and
ARTHUR JOHN ALEXANDER MITCHELL
By
Bailey, Stephens & Huettig
Attorneys Inventors
STEWART STEWART TRESILIAN and
ARTHUR JOHN ALEXANDER MITCHELL
By
Bailey, Stephens & Huettig
Attorneys

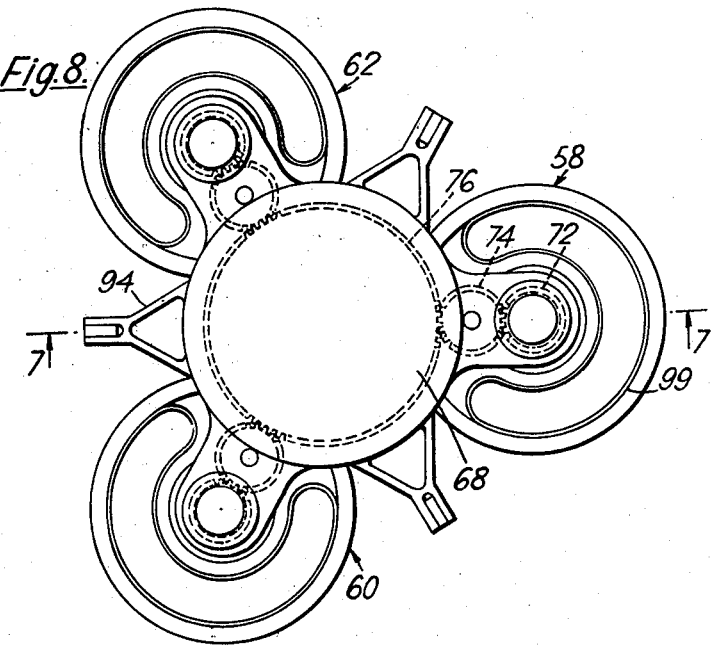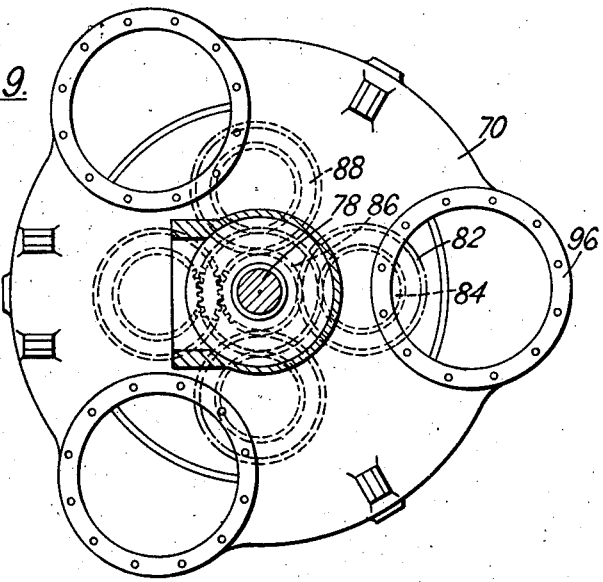

Oct. 13, 1964    S. S. TRESILIAN ETAL    3,152,776
VEHICLES OF USE ON LAND AND IN THE AIR
Filed March 28, 1961    12 Sheets-Sheet 9

Inventors:
STEWART STEWART TRESILIAN and
ARTHUR JOHN ALEXANDER MITCHELL
By
Bailey, Stephens & Huettig
Attorneys:

Oct. 13, 1964 S. S. TRESILIAN ETAL 3,152,776
VEHICLES OF USE ON LAND AND IN THE AIR
Filed March 28, 1961 12 Sheets-Sheet 10
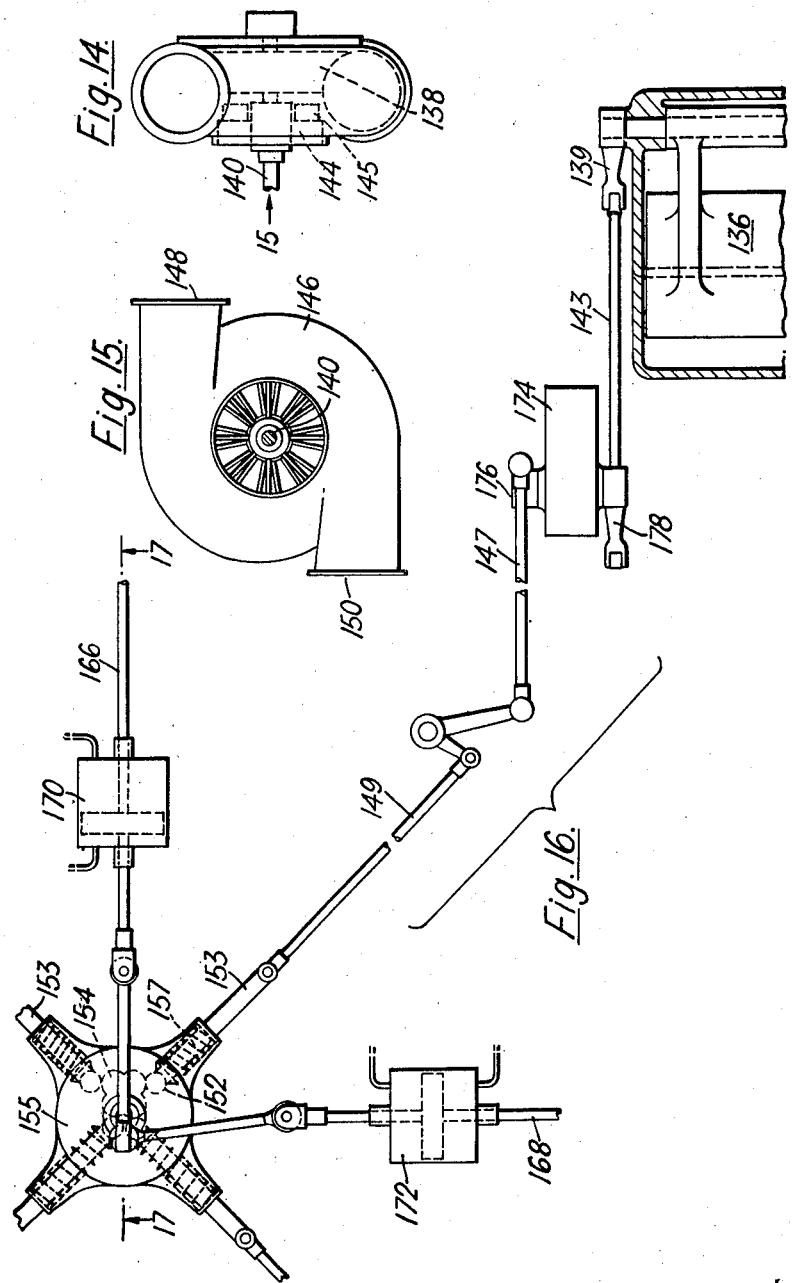
Inventors:
STEWART STEWART TRESILIAN and
ARTHUR JOHN ALEXANDER MITCHELL
By
Bailey, Stephens & Huettig
Attorneys

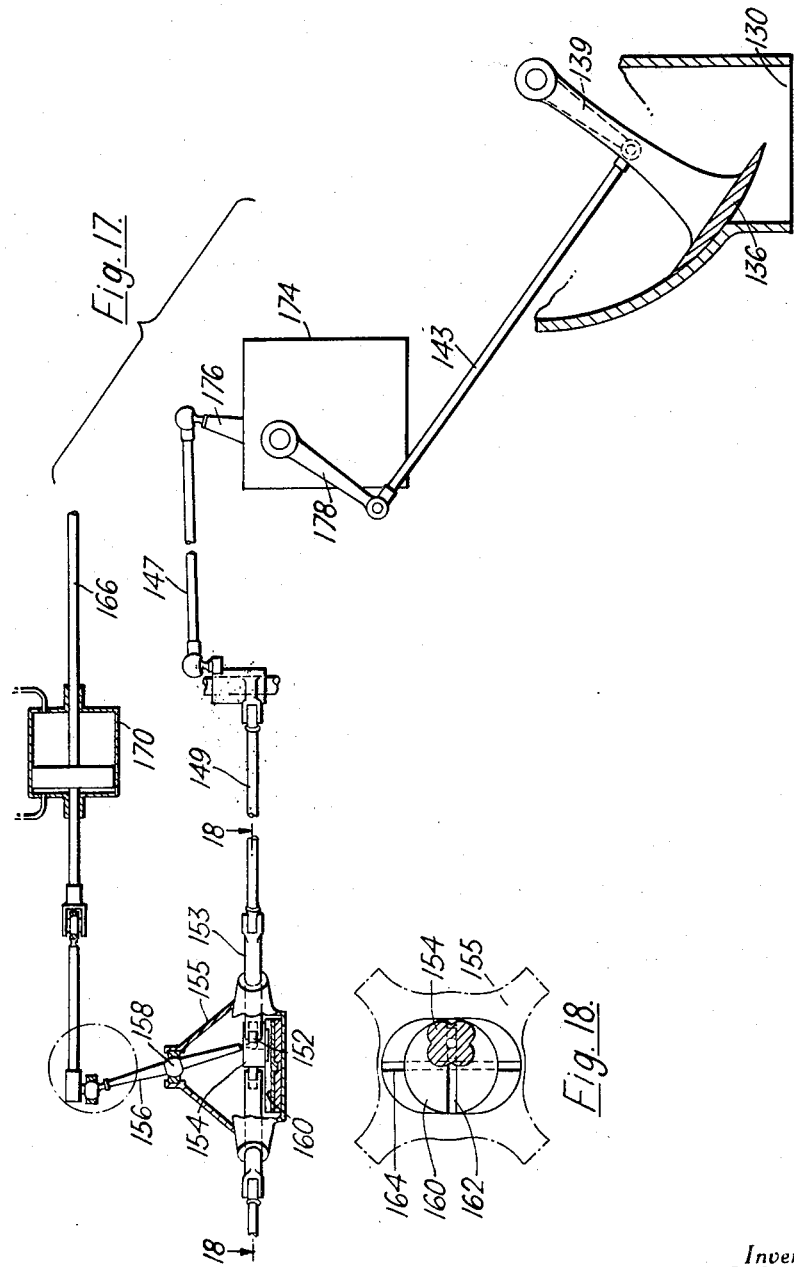

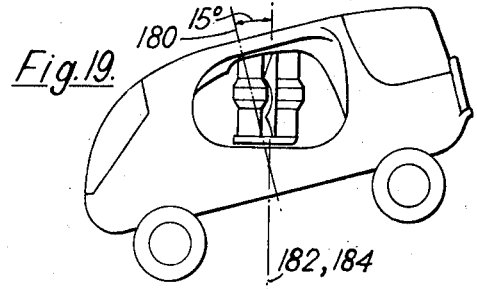
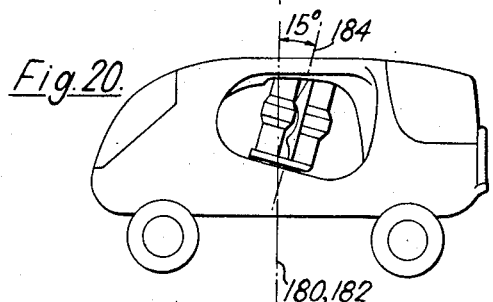
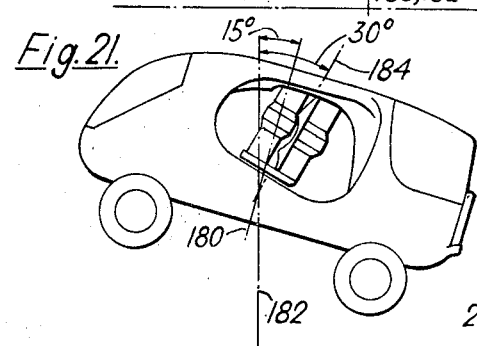
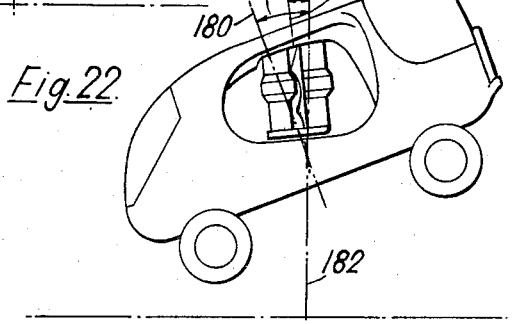

United States Patent Office 3,152,776
Patented Oct. 13, 1964

3,152,776
VEHICLES OF USE ON LAND AND IN THE AIR
Stewart Stewart Tresilian and Arthur John Alexander Mitchell, Bristol, England, assignors to Bristol Siddeley Engines Limited, Bristol, England, a British company
Filed Mar. 28, 1961, Ser. No. 99,013
Claims priority, application Great Britain Mar. 29, 1960
3 Claims. (Cl. 244—23)

This invention relates to aerial vehicles which can take off and land substantially vertically and hover in flight.

According to the present invention an aerial vehicle has a body, comprising top and bottom surfaces joined by front and rear walls and two side walls, which encloses a ducted fan arranged to draw air inwards from the atmosphere through two sideways facing intake openings, one in each of the side walls, and to discharge the air downwards through an outlet opening in the bottom surface so as to produce a lifting force on the vehicle.

One example of a vehicle according to the present invention will now be described with reference to the accompanying drawings, in which:

FIGURE 1 is a perspective view of the vehicle;

FIGURES 2, 3 and 4 are respectively a side elevation, plan, and front elevation of the vehicle;

FIGURE 5 is a side elevation of the power units of the vehicle;

Figure 7:
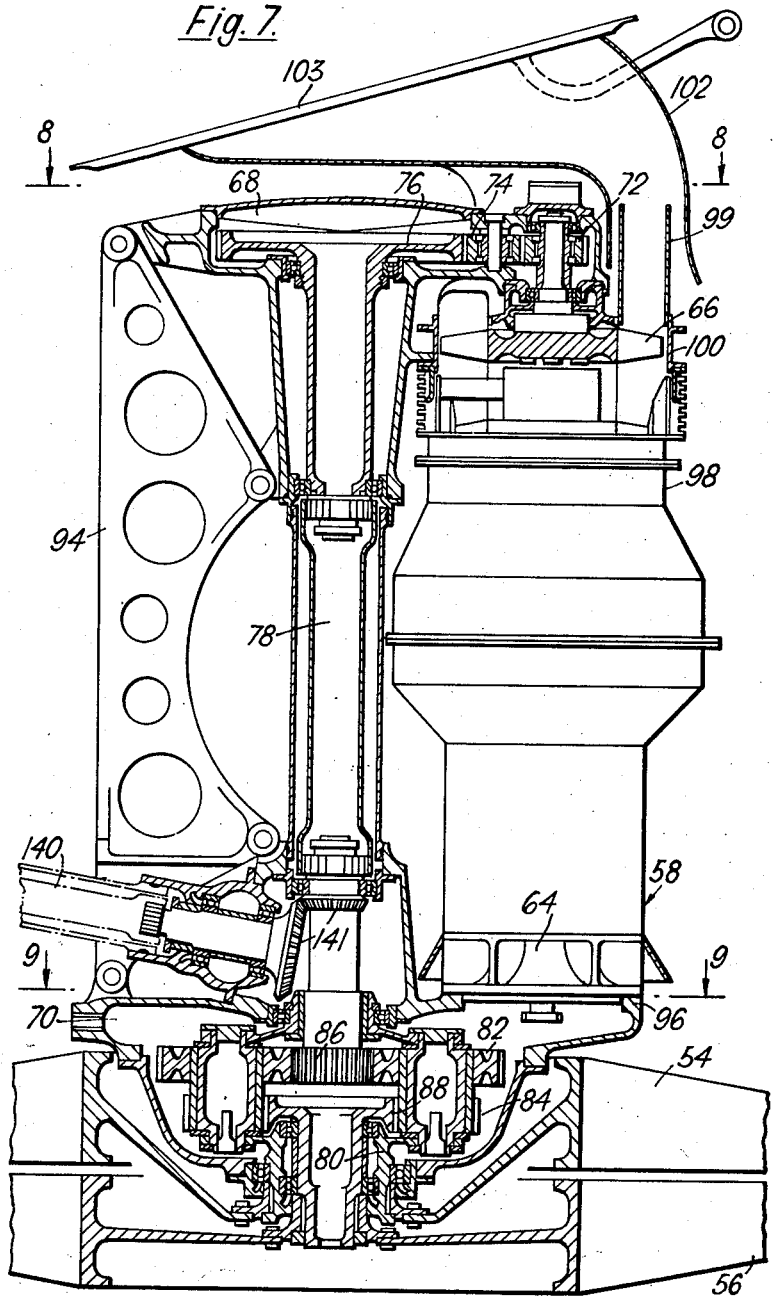
FIGURE 7 is a side elevation of the drive to the fan, with parts in section on the line 7—7 in FIGURE 8, on a larger scale, and with the engine which is beyond the plane of section omitted.
Figure 10:
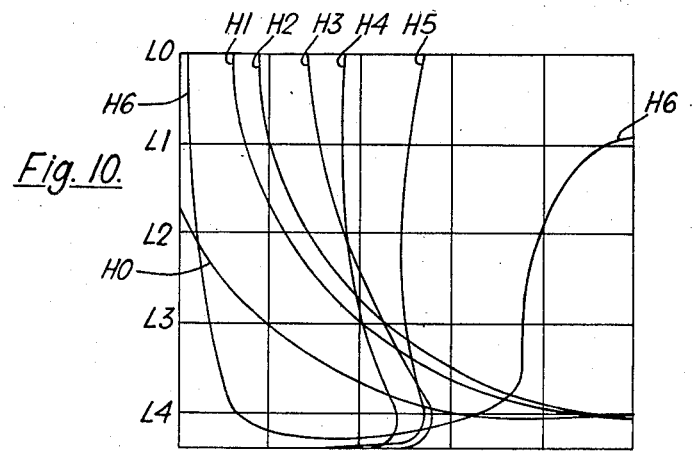
Figure 11:
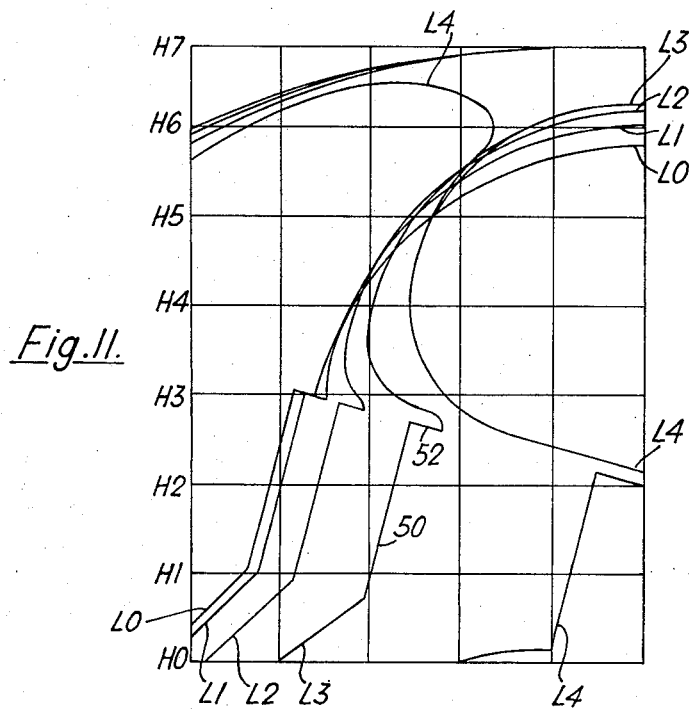
Figure 12:
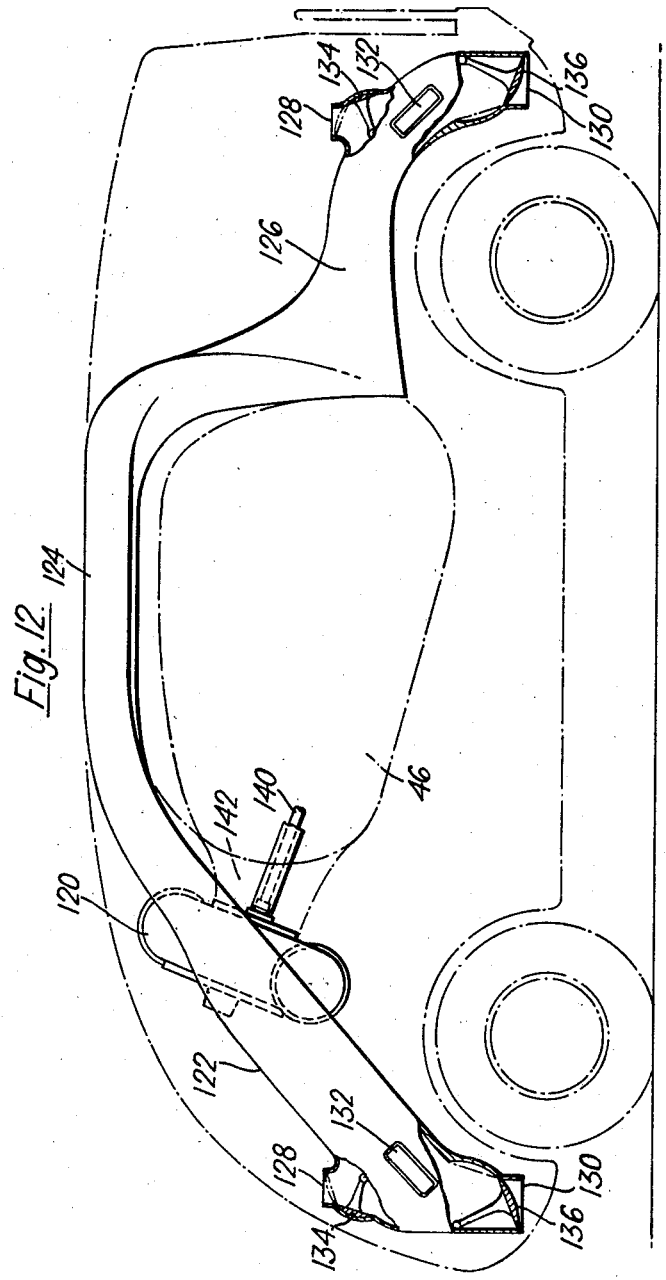
Figure 13:
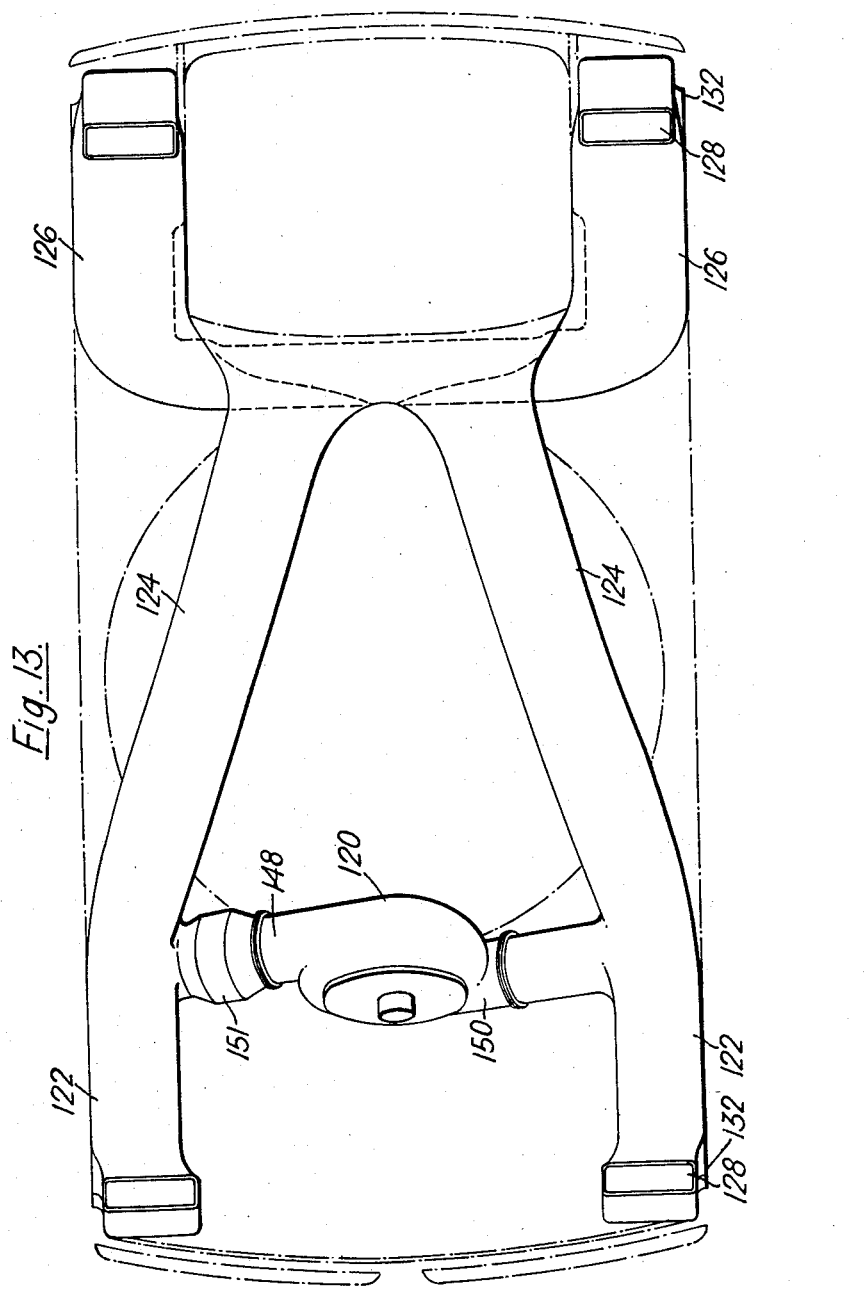

FIGURES 8 and 9 are sections on the lines 8—8 and 9—9 in FIGURE 7;

FIGURES 10 and 11 are graphs showing horizontal and longitudinal lines for indicating the shape of the rear part of the boundary of the right-hand intake opening;

FIGURES 12 and 13 are a side elevation and plan of a blower and ducting of a control system, parts being broken away in FIGURE 12;

FIGURE 14 is a side elevation of the blower, seen from the left side;

FIGURE 15 is a view of the front of the blower, seen in the direction of the arrow 15 in FIGURE 14;

FIGURE 16 is a fragmentary plan of a control linkage;

FIGURE 17 is a fragmentary elevation of the control linkage, with part in section on the line 17—17 in FIGURE 16;

FIGURE 18 is a horizontal section of a detail, on the line 18—18 in FIGURE 17; and FIGURES 19 to 22 are diagrams showing different attitudes assumed by the vehicle for different conditions of flight.

The vehicle shown in the drawings is intended to travel on road wheels 30, 32 on roads and over rough country, and to be able to make flights of up to about one hour's duration for the purpose of observation or crossing obstacles with a maximum flying speed of the order of 80 miles per hour. In flight the vehicle is sustained and propelled by air discharged by a ducted fan 34 situated in the middle of the bottom of the vehicle.

Because the airspeed required is not high, the body of the vehicle is basically rectangular in shape, with top and bottom surfaces 36, 38, joined by a front wall 40, a rear wall 42, and two side walls 44. The body is made of resin-impregnated glass fibres. The ducted fan 34 draws air inwards from the atmosphere through two sideways facing intake openings 46, one in each of the side walls. In effect there is a T-shaped passage within the body; the intake openings being at the two ends of the cross bar, and the leg of the T being constituted by the duct 48 for the fan. The walls of this internal passage, especially the rear part of the walls, should be shaped to obtain as high as possible an aerodynamic efficiency in the deflection of air which has been flowing rearwards relatively to the vehicle, and which on entering the intake openings is required to flow laterally inwards, and then downwards. FIGURES 10 and 11 show the general nature of this shape. The lines H1, H2 etc. are horizontal sections at intervals of one foot above a datum H0, and the lines L1, L2 etc. are longitudinal vertical sections at intervals of one foot from a central vertical plane L0. These lines show the shape of the wall of the body passage. The actual fan duct 48 is in the form of a ring fitted upwards within a cylindrical surface 50 and against a shoulder 52 (FIGURE 11).

The fan has two contra-rotating rotors 54, 56, and is driven by three gas turbine engines 58, 60, 62, of equal power. The axis of the fan duct 48 and of the fan 34 is inclined downwards and rearwards at an angle of 15° to a vertical datum line. The engines are placed in a cluster above the fan, with their axes of rotation parallel to the axis of the fan. Each engine has a compressor air inlet 64 at its lower end which receives air through the intake openings 46, a turbine (not shown) to drive its compressor, and a free power turbine 66 (FIGURE 7) coupled to the fan.

The drive from the free power turbines 66 to the fan is by way of upper and lower gearboxes 68, 70. In the upper gearbox (FIGURE 8) each power turbine drives from a pinion 72, through an idler pinion 74, to a gear 76 on a central shaft 78, which extends downwards to the lower gearbox 70. In the lower gearbox is a planetary gearing system consisting of a cage 80 carrying pairs of interconnected planet pinions 82, 84, meshing with sun gears 86, 88 respectively, which are of different size. The sun gear 86 is fixed to the shaft 78, the sun gear 88 is connected to the lower fan rotor 56, and the cage 80 is connected to the upper fan rotor 54. The result of this arrangement is that the two rotors are driven in opposite directions, and since they experience equal drag, they turn at substantially equal speeds and with negligible torque reaction on the vehicle.

The lower gearbox 70 acts as a housing for bearings for the rotors of the fan. It and the engines are located by being connected to three points on the fan duct 48 by stays 90, 92, and to one another by plates 94 and by flanged connections 96 (FIGURES 7 to 9). In this way the engines and fan are isolated from any distortion of the vehicle body such as may occur at landing, and the fan rotors are prevented from scraping the duct. The upper end of each engine housing 98 is free to move axially relatively to the power turbine 66, and makes a telescopic joint with a turbine housing 100, which in turn has an arcuate spigot 99 which telescopes into an exhaust manifold 102. The manifold leads to a discharge opening 101 in the top surface of the body, provided with a lid 103 which closes the opening when the vehicle is travelling on the ground and is opened to direct the exhaust rearwards when the flight propulsion engines are in operation as shown at 104 in FIGURE 1.

Bars 106 protect the intake openings against accidents to personnel. The number of bars across the intake openings should be no greater than necessary, as they may prove liable to icing and require provision for de-icing. Longitudinal webs 108 across the bottom of the fan duct protect the fan from damage when driving over rough country.

In front of the transverse passage between the intake openings is a cockpit 110 for a crew of two. Here, as described in more detail later, are the necessary controls for road travel and for flight.

Figure 6:
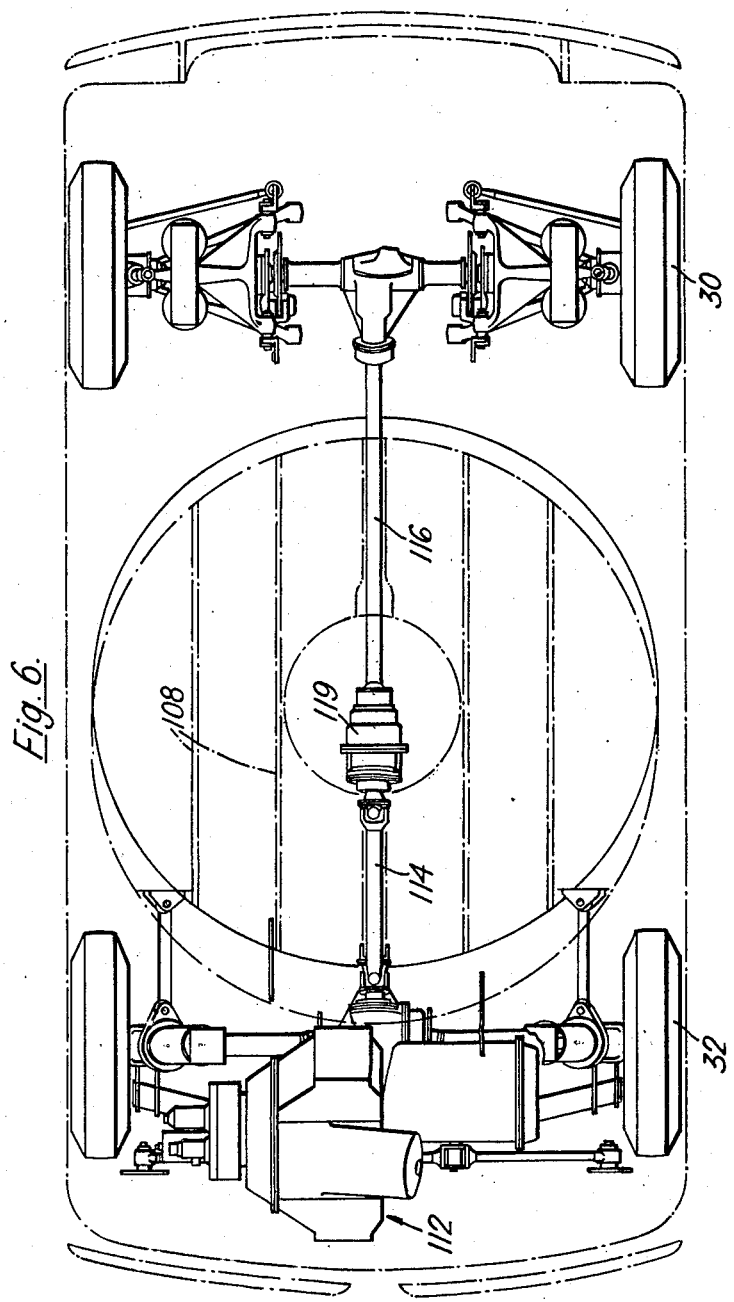
FIGURE 6 is a plan of the road wheels and their drive.

Behind the transverse passage is a compartment housing an engine 112 separate from the fan drive, arranged to drive the road wheels 30, 32 through a four-wheel drive transmission shown in FIGURES 5 and 6. Three propeller shafts 114, 116, 118 are arranged on the centre line, with a transfer box 119 placed below the hub of the fan, so that there is little interference with the discharge from the fan. The engine 112 is a gas turbine engine, and thus may use the same fuel as the engines 58, 60, 62, but is rated to run for much longer periods than the fan engines. The fuel is carried in tanks located around the fan duct. A flow proportioner ensures that the tanks are emptied equally to avoid an appreciable shift of the centre of gravity. The suspension of the road wheels is designed to be suitable for travel over rough country, and also to absorb impact when the vehicle lands from a flight, possibly touching down on one wheel first. The road wheel engine 112 draws in air and discharges exhaust through openings in the rear wall of the body.

In the same compartment as the engine 112 is a blower 120 which, as shown in FIGURES 12 and 13, supplies air through ducting 122, 124, 126 to outlets which are controllable by valves and which are disposed so that the discharges of air from the outlets will provide variable forces on the vehicle for controlling its attitude. At each side at the front and at each side at the back is a set of three outlets, 128 directed upwards, 130 directed downwards, and 132 directed laterally outwards, with individual control valves immediately inside the outlets, as shown at 134 and 136.

The ducting 122, 124, 126 leading from the blower to the outlets is made integrally with the walls of the body, and thus contributes substantially to the structural strength of the body.

The rotor 138 of the blower (FIGURE 14) is driven by a shaft 140 which, as shown in FIGURE 7, is driven by bevel gearing 141 from the central shaft 78, so that the blower is positively geared to the fan. The blower is just behind a plane joining the rear parts of the boundaries of the intake openings 46, and draws in air through the intake openings, via an inlet 142. The shaft 140 is supported in the inlet 142 by a spider of vanes 144, each having a trailing edge flap portion 145 which can be deflected to restrict the flow through the inlet. There are no vanes in the diffuser 146 of the blower, which enables the blower to operate with reasonable efficiency over a wide range of fan speeds. The diffuser has two outlets 148, 150 leading to the ducting 122, 124, in one of which is a cooler 151 for the oil of the engine lubrication systems. The two ducts 124 join behind the cockpit 110, and then branch into the ducts 126.

The four outlets 130 serve to control the vehicle about a pitch axis, and about a roll axis. The valves 136 are controlled by a control column 137 (FIGURE 1), through linkage, part of which is shown in FIGURES 16 to 18. Each valve 136, of which the front righthand one is shown, is connected by a crank 139 and rods 143, 147, 149 to one of four plungers 153 entering a housing 155. The plunger is urged inwards by a spring 157 (omitted in FIGURE 17 for clarity) and carries a roller 152 which bears against a cam member 154. This cam member can be moved in all directions in a plane, by means of an arm 156 which is ball jointed in the cam member and at 158 in the housing. The cam member is prevented from turning by a plate 160, which has a keyway 162 in which a key on the cam member can slide, and which has a key sliding in a second keyway 164 at right angles, in the base of the housing 155. The arm 156 is given movements reproducing those of the control column, by means of linkage 166, 168, and servo cylinders 170, 172 which receive signals from the output of a stabilising device, not shown, into which are fed signals from the control column, from a gyro, and from an altimeter. The cam member is so shaped that the increase of opening of one valve is accompanied by an equivalent decrease of opening of at least one of the remaining valves. Thus the valves may be so operated that either all the valves are opened to an extent totalling less than the equivalent of one fully opened valve, or any two valves may be opened to a total extent not greater than the equivalent of one fully opened valve (the other two valves being shut). Thus the demand on the blower remains constant for moderate movements of the cam member. Moreover, the cam member is so shaped that a full diagonal movement of the arm 156 causes one valve to open fully and the other three valves all to close fully, so that an increased upward force is applied wholly to one corner of the vehicle. This enables any tendency for one corner of the vehicle to drop to be quickly corrected. To assist this action, the rods 143 and 147 are connected by mechanism 174 interconnecting two cranks 176, 178 so that the relationship between the angular movements of the two cranks is non-linear. The flap portions 145 of the blower inlet vanes are linked by means, not shown, to the control valve linkage, so that the blower inlet is normally somewhat restricted, but is opened fully when one valve 136 is opened fully.

The four outlets 132 control the vehicle about a yaw axis. The valves, not shown, in these outlets, are controlled by a wheel 179 on the control column.

The four outlets 128 are used to give more rapid adjustments to rate of descent than can be obtained by control of the fuel supply to the fan engines. For landing, the vehicle is brought, by control of the fuel supply, into a nearly hovering condition, a short distance above ground. Then the outlets 128 are quickly opened and produce a downward force by which the vehicle is forced down to the ground and held there.

Within the lower gearbox are brakes, not shown, by means of which the fan rotors and blower can be held stationary. This enables the fan engines to be started and tested with the power turbines stalled, without stirring up dust until the vehicle is ready to take off.

FIGURES 19 to 22 illustrate various conditions of flight. Reference has been made to a vertical datum line in the vehicle and this is a line with respect to which the remainder of the vehicle is arranged, that is to say when the datum line is in fact vertical, the road wheels are tangent to a horizontal plane, and the crew are able to sit normally. This situation is shown in FIGURE 20, in which the line 180, 182 represents both the datum line and an actual vertical line. With the vehicle in this attitude, the fan discharge, directed along the fan axis 184, is inclined at 15° from the vertical. With the fan engines operating at cruising conditions, this discharge will cause the vehicle to move in level flight at constant cruising speed.

For hovering, and vertical ascent or descent, the vehicle is tilted nose-up (FIGURE 19), with the vertical datum line 180 inclined at 15° to the true vertical. In this situation, the fan axis nearly coincides with the true vertical, the fan discharge being in fact directed slightly forward to produce a small rearward component of force on the vehicle to equal the forward force imparted by the exhaust from the fan engines.

If, in the situation shown in FIGURE 20, the fuel supply is increased, the vehicle will not only accelerate forwards, but will also climb. In order to accelerate directly forwardly, and to travel at full speed directly forwards, the vehicle is tilted nose-down, as shown in FIGURE 21, with the vertical datum line 180 inclined at 15° from the true vertical 182, and with the fan axis 184 consequently inclined at 30° from the true vertical.

In order to decelerate in level flight, and even to move slowly rearwards, the vehicle is tilted even further nose-up than is required for hovering. This situation is shown in FIGURE 22, with the vertical datum line inclined at 22½° from the true vertical 182, and with the fan axis 184 inclined at 7½° from the true vertical, discharging somewhat forwards. In this attitude the body opposes a large drag to forward movement.

A principal feature of this vehicle, and of all vehicles according to the present invention, is that the ducted fan draws in its air through openings which face sideways. The significance of this derives from the fact that the fan inlet drag is one of the major forces acting on the vehicle. This fan inlet drag is the force required to destroy the rearward momentum, relative to the vehicle, of all the air entering the intake openings.

The fan inlet drag may be represented as a single force. If the vehicle is not travelling directly in the direction in which it is heading, then the fan inlet drag intersects the central longitudinal plane of the vehicle at an angle, and the point of intersection may be called the point of application of the drag. If this point is in front of the centre of gravity of the vehicle, then the vehicle will be directionally unstable. Consequently an inlet in the front of the vehicle would produce gross instability, in addition to the difficulty that an inlet of sufficient area for a ducted fan would leave no frontal area for crew accommodation.

In addition, if the fan inlet drag passes above the centre of gravity shown at 200 in FIGURE 2, every acceleration or deceleration of the fan will be accompanied by a tendency for the vehicle to pitch, and if an intake is located in the roof of a vehicle, this pitching tendency is very strong. Placing the intake openings in the side walls as shown produces a fan inlet drag which is not far above the centre of gravity 200. Preferably the side intake openings are placed as low as possible, which means that the lower part of the boundary of each intake opening is close to the plane of the circumference of the top of the fan duct. At the same time, for the sake of stability on the road, the centre of gravity is kept fairly low, but not too low in relation to the height at which the fan inlet drag acts. It is possible for the intake openings to face slightly forwards, as in the example shown in which the cockpit is somewhat narrower than the rest of the vehicle, but this tends to increase the nose-up moment exerted by the intake drag on the vehicle.

Moreover, as shown in the example, the preferred position of the fan is with the axis of rotation of the fan nearly vertical, and the fan and its duct adjacent to the bottom of the body. With this arrangement the fan is shielded from any effect arising from the fact that the relative velocity of the external airstream and the fan blades varies according as to whether the blades are advancing or retreating.

As shown in the example, the air is preferably discharged from the fan duct in a direction which is inclined downwards and rearwards at an angle of the order of 15° from a vertical datum line in the vehicle. With the order of magnitude of fan inlet drag that is found to be attainable, this amount of rearward inclination of discharge produces a correct ratio, when the vehicle is in a level attitude, between the vertical component of the fan thrust, which balances the weight of the vehicle, and the horizontal component of the fan thrust which together with the force exerted by the engine exhaust, balances the fan inlet drag plus the drag of the vehicle body, in forward flight at cruising speed.

For maneouvre, the simplest means of varying the inclination of the fan discharge to the true vertical is, as shown in the example, to tilt the vehicle bodily. The direction of discharge relative to the vehicle is then invariable. However, other means of varying the inclination of discharge include deflecting the discharge forwards or rearwards by means of tilting vanes at the fan duct outlet; making the duct part-spherical and tilting the fan; and tilting the fan and duct as a unit; any of which means may be allied with tilting the body to a reduced extent.

The use of a duct which is not axially longer than the fan produces a light and compact arrangement, but it is possible for the fan axis to be inclined substantially to the direction of discharge, and the duct to be prolonged downstream of the fan in a bend. There may even be two fans with ducts which lead to a common discharge opening.

It is simple to arrange engines with their axes parallel to the fan axis, but this disposition is not essential. The advantage of placing the engines with their exhausts at the top is that the fan and its duct are not subjected to the hot exhaust gases. The exhaust is then unable to contribute to the upward force on the vehicle, but, by being deflected rearwards, does contribute to the forward force.

The use of contra-rotating fan rotors obviates any torque reaction on the vehicle both when the fan is running at constant speed and when the fan is accelerating or decelerating, but a single fan rotor may be used.

The use of three engines is preferred, but one, or two, or more than three is feasible. The difference between the rating of an engine for say on hour, and a few minutes, is such that if three engines provide all the power necessary for continuous operations, then, if one fails, the other two can be run for a few minutes at sufficient power to sustain the vehicle.

The preferred control system, with the blower positively geared to the fan, has the advantage that failure of an engine cannot stop the blower. Moreover, when the fan speed changes, either for change of speed of the vehicle, or more particularly to cope with a change of air density with altitude, the blower speed likewise changes, so that the ratio of fan discharge to blower discharge is hardly affected. Engines which are at present readily available have a power output at the exhaust end, as shown in the example. However, it would be possible to use engines with a shaft passing through the centre from the power turbine to give a power output at the inlet end. It would also be possible to use engines of reverse-flow type.

In order that the power absorbed in controlling the vehicle shall be a minimum, the blower should operate at a low compression ratio. It is possible, in place of using a separate blower, to bleed control air from the compressors of the engines, but that is less efficient, and involves connections to all the engines as a safeguard against engine failure.

The upward control outlets are preferred, but not essential. Each set of lateral and downward outlets may be replaced by a single fixed outlet inclined outwards and downwards with a valve responding to the combined effect of two controls, or by a single outlet terminating in a nozzle which is swivelled in response to the controls.

We claim:

1. A vehicle for use on land and in the air, comprising:
   (a) top and bottom members, and front and rear walls and two side walls connecting the top and bottom members to form a generally rectangular body;
   (b) means defining at least two opposed sideways-facing inlet openings, one in each of said side walls, and a central outlet opening in said bottom member;
   (c) means defining a T-shaped passage within said body, comprising arms communicating with said two inlet openings and a duct extending downwards from said arms to said outlet opening;
   (d) said sideways-facing inlet opening forming substantially the only inlets to said T-shaped passage;
   (e) axial flow fan means in said duct operative to deliver downwards through said outlet opening an air flow sufficient to support said vehicle in flight, said inlet openings and arms being adapted to deflect laterally inwards, and then downwards to said fan means, with low aerodynamic losses, two air flows each substantially equal in mass flow to half said downward air flow;
   (f) a road engine mounted at the rear of the vehicle, road wheels extending beneath said bottom member, and means drivingly connecting said road engine to at least two of said road wheels;

(g) and said axial flow fan means comprising a plurality of fan engines mounted in said passage, a plurality of fans, fan drive means coupled to said fans, and individual connections between each of said fan engines and said fan drive means;

(h) the axial flow fan means being located centrally of the vehicle and the duct having its axis downwardly and rearwardly inclined, and (i) a crew compartment at the front of the vehicle.

2. A vehicle as claimed in claim 1, and comprising:

(j) a blower, individually controllable outlets from said body spaced in a plurality of directions from one another, duct means connecting said blower to said controllable outlets, and positive coupling means drivingly connecting said blower to said fan drive means.

3. A vehicle as claimed in claim 1, and comprising:

(j) means defining an outlet for exhaust gas at the upper end of each of said fan engines, and means for directing gas from all said engine outlets rearwards above said top member of the body.

References Cited in the file of this patent

UNITED STATES PATENTS

| | | |
|---|---|---|
| 1,454,283 | Hollander | May 8, 1923 |
| 2,518,623 | Judge | Aug. 15, 1950 |
| 2,828,929 | Lippisch | Apr. 1, 1958 |
| 2,838,257 | Wibault | June 10, 1958 |
| 2,870,978 | Griffith et al. | Jan. 27, 1959 |
| 2,876,965 | Streib | Mar. 10, 1959 |
| 2,927,746 | Mellen | Mar. 8, 1960 |
| 2,936,973 | Kappus | May 17, 1960 |
| 2,937,492 | Lehberger | May 24, 1960 |
| 2,982,495 | Griffith | May 2, 1961 |
| 2,989,269 | Le Bel | June 20, 1961 |

FOREIGN PATENTS

| | | |
|---|---|---|
| 610,143 | Great Britain | Oct. 12, 1948 |
| 865,568 | Great Britain | Apr. 19, 1961 |
| 1,119,675 | Germany | Dec. 14, 1961 |